United States Patent [19]
Andersen

[11] Patent Number: 5,495,502
[45] Date of Patent: Feb. 27, 1996

[54] ADAPTIVE CROSS-POLARIZATION EQUALIZER

[75] Inventor: Steven Andersen, San Jose, Calif.

[73] Assignee: Loral Aerospace Corp., New York, N.Y.

[21] Appl. No.: 229,326

[22] Filed: Apr. 18, 1994

[51] Int. Cl.$^6$ .............................. H03H 7/30; H03H 7/40; H04B 1/10
[52] U.S. Cl. ...................... 375/235; 375/349; 455/278.1; 455/295
[58] Field of Search ..................................... 375/232, 235, 375/229, 349, 347, 346; 455/278.1, 272, 273, 295, 303, 296; 370/6

[56] References Cited

U.S. PATENT DOCUMENTS

| | | | |
|---|---|---|---|
| 4,438,530 | 3/1984 | Steinberger | 455/278.1 |
| 4,466,132 | 8/1984 | Namiki | 455/295 |
| 5,157,697 | 10/1992 | Anvari et al. | 375/349 |
| 5,297,171 | 3/1994 | Koch | 455/278.1 |
| 5,349,609 | 9/1994 | Tsujimoto | 455/278.1 |

*Primary Examiner*—Stephen Chin
*Assistant Examiner*—Hai H. Phan
*Attorney, Agent, or Firm*—Kenneth W. Float; Anthony W. Karambelas

[57] ABSTRACT

An equalizer employed with a receiver for cancelling an interfering signal due to low cross-polarization isolation. The present equalizer provides a simple and inexpensive cross-polarization interference cancellation system. The equalizer uses an error signal generated in an adaptive baseband equalizer to determine the magnitude of an interfering signal and inputs a cancelling signal to the co-polarized channel until power in the error signal derived from the adaptive baseband equalizer is minimized. In the equalizer, the determination of the magnitude of the interfering signal is performed at baseband (after demodulation but prior to data detection) and the cancellation is performed at RF, prior to dispersive microwave elements. The equalizer enhances the capability for transmitting two unique signals in the same frequency allocation on orthogonal polarizations. The equalizer operates even if the modulations and data rates on the two channels are different. In the receiver, co- and cross-polarized signals are received and amplified. A copy of the cross channel input signal is supplied to each receiver channel. An RF vector modulator is used to control the phase and amplitude of the cross-polarized signal prior to summation with a desired co-polarized signal. When the amplitude and the phase of the vector modulator are correctly set the interfering signal is cancelled. Control for the vector modulator is generated by minimizing the magnitude of the error signal in the adaptive baseband equalizer. The error signal is the difference between the received baseband data and an estimate of the ideal transmitted data. A control logic circuit sets the: phase and amplitude for the vector modulator to minimize the magnitude of the error signal by stepping the setting of the vector modulator by one unit and sampling the power in the error signal. If the power is reduced the vector modulator is stepped again in the same direction. If the power is increased the vector modulator is stepped in the opposite direction.

6 Claims, 2 Drawing Sheets

ADAPTIVE CROSS-POLARIZATION EQUALIZER

BACKGROUND

The present invention relates to adaptive equalizers, and more particularly, to an adaptive cross-polarization equalizer that provides for cancellation of an interfering signal due to low cross-polarization isolation caused by rain on high data rate communication links.

With the increasing utilization of radio frequency communications, the allocatable radio frequency spectrum is rapidly becoming limited. Commercial allocations are encroaching on frequencies which to date have been available for broadband communications. In the future, it will be difficult to provide contiguous RF allocations of several gigahertz for multi-gigahertz communications systems. Therefore, the radio frequency spectrum must be more efficiently managed and utilized. Frequency reuse, using orthogonal polarizations, is one approach to greater efficiency.

Adaptive baseband cancellation architectures have heretofore been developed in order to increase the available radio frequency spectrum utilization, but without complete success. These types of architectures typically use "four rail" adaptive baseband transversal equalizers. These architectures require computation of the correlation of the interference on the I and Q signals of each channel with the I and Q signals of the other channel as well as the I and Q signals within each channel. These are very complex architectures and are tied to one modulation and data rate.

The present invention addresses the problem of depolarization in communications systems. Depolarization introduces an interfering signal from the cross-polarized signal into the co-polarized signal. The primary source of interfering signals that cause depolarization is rain. To optimize system performance, the effects of the interfering signals must be minimized. Available field test data and analysis to date indicate that cross-polarization interference due to rain has a fluctuating amplitude and phase shift but that the depolarizing phenomena is nondispersive. The rate of fluctuation is estimated to be less than 1 Hz. Furthermore, due to the dispersive nature of filters in downconverters and demodulators used in adaptive equalizers and to avoid having to match delays between the two receivers, it is desirable to perform cross-polarization cancellation as close to the front end of the microwave chain as possible.

For the purposes of reference, U.S. Pat. No. 5,157,697 issued to Anvaru describes a system that suppresses crosstalk between orthogonal channels by subtracting a portion of the signal of one channel from the other as controlled by correlation factors. U.S. Pat. No. 4,466,132 issued to Namiki describes a system that eliminates crosstalk between two mutually orthogonal cross-polarized channels. The following references describe systems that are generally similar to the Namiki patent: U.S. Pat. No. 4,112,370 issued to Monson; U.S. Pat. No. 4,438,530 issued to Steinberger, U.S. Pat. No. 4,479,258 issued to Namiki; U.S. Pat. No. 4,637,067 issued to Steinberger; and U.S. Pat. No. 4,688,235 issued to Tahara et al. U.S. Pat. No. 3,735,266 issued to Amitay and U.S. Pat. No. 4,090,137 issued to Soma et al describe systems that reduce or minimize crosstalk between cross-polarized channels utilizing pilot signals to indicate the level of crosstalk.

Therefore, it is an objective of the present invention to provide for an adaptive cross-polarization equalizer that provides for cancellation of an interfering signal due to low cross-polarization isolation caused by rain on high data rate communication links.

SUMMARY OF THE INVENTION

In order to meet the above and other objectives, the present invention comprises an adaptive cross-polarization equalizer that provides for cancellation of an interfering signal due to low cross-polarization isolation caused by rain on high data rate communication links. The adaptive cross-polarization equalizer is employed with a receiver that comprises co-polarization and cross-polarization receiver channels for processing co- and cross-polarized input signals. Each channel comprises a low noise amplifier, a summing device, a downconverter, a demodulator, a least mean-square estimate adaptive baseband equalizer, and a bit sync data detection circuit.

The adaptive cross-polarization equalizer comprises a baseband error signal detector, control logic, and a vector modulator. The baseband error signal detector includes first and second squaring circuits that process error signals generated by the least mean-square estimate adaptive baseband equalizer. Squared outputs of the first and second squaring circuits are summed in a summing device and filtered by a low pass filter. The filtered output: of the low pass filter is applied to the control logic.

The control logic comprises an analog to digital converter which processes the output of the low pass filter to produce digitized signal for processing. The output of the analog to digital converter is processed by a logic circuit which generates control signals that control the vector modulator. The output of the logic circuit is demultiplexed by a demultiplexer, and outputs of the demultiplexer are processed by the vector modulator.

The vector modulator comprises first and second multipliers that combine output signals derived from the respective demultiplexer with output signals generated by a zero-degree hybrid. The zero-degree hybrid generates its output signals from the output of the power divider of the cross-polarization receiver channel. Outputs of the respective multipliers are applied to a ninety-degree hybrid which combines the respective output signals therefrom and applies the summed signal to the summing device in the co-polarized receiver channel which sums this signal with the amplified co-polarized input signal.

The present equalizer uses an error signal generated in the adaptive baseband equalizer to determine the magnitude of the interfering signal and then inputs a cancelling signal at the front end of the co-polarized channel until power in the error signal derived from the adaptive baseband equalizer is minimized. The determination of the magnitude of the interfering signal is performed at baseband (after demodulation but prior to data detection) and the cancellation is performed at RF, prior to dispersive microwave elements. The present equalizer enhances the capability for transmitting two unique signals in the same frequency allocation on orthogonal polarizations, and operates even if the modulations and data rates on the two channels are different.

The present equalizer provides a simple and inexpensive cross-polarization interference cancellation system. The equalizer may be used with any digital modulation format and any data rate above 10 Mbps on either channel. The cancellation system can track variations in cross-polarization interference amplitude and phase of 10 Hz, minimum. If the cross-polarization phenomena is dispersive, additional vector modulators may be added at RF in a transversal filter arrangement and controlled using the same architecture.

Control for the vector modulator is generated by minimizing the magnitude of the error signal in the adaptive baseband equalizer. The error signal is the difference between the received baseband data and an idealized estimate of the transmitted data. This signal is made up of data noise due to non-ideal channel, thermal noise, and the interfering signal. Although the present equalizer is designed for receivers that employ an adaptive baseband transversal equalizer, the design is also applicable to receivers that do not have an adaptive baseband transversal equalizer. In this case, the error signal inputs to the equalizer are replaced by I and Q analog inputs and the error signal circuitry provided by the adaptive baseband transversal equalizer is incorporated into the equalizer.

The control logic circuit steps the setting of the vector modulator by one unit and sampling the power in the error signal. If the power is reduced the vector modulator is stepped again in the same direction. If the power is increased the vector modulator is stepped in the opposite direction. The vector modulator has two controls corresponding to an I-Q coordinate system. The controls are dithered one at a time, four consecutive times each.

The present equalizer implementation does not require symmetry between the orthogonal receiver channels. They may differ in both data rate and modulation. If the two cross-polarization phenomena are not symmetrical, the equalizer is not adversely effected. If the cross-polarization phenomena is dispersive, multiple vector modulators may be added in a transversal filter arrangement and controlled in the same manner.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
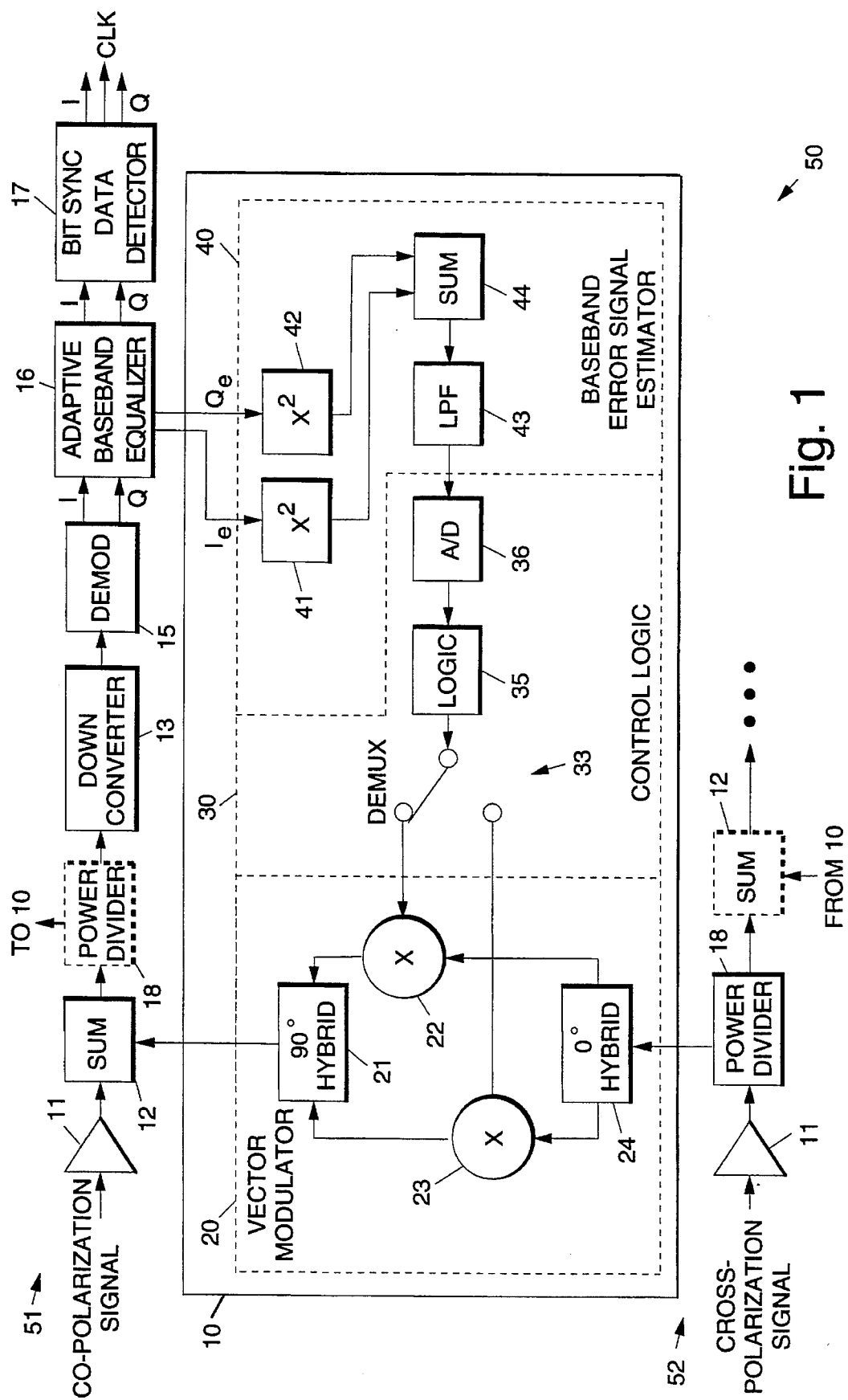
FIG. 1 is a block diagram of an adaptive cross-polarization equalizer in accordance with the principles of the present invention.

Referring to the drawing figures, FIG. 1 is a block diagram of a receiver 50 employing an adaptive cross-polarization equalizer 10 in accordance with the principles of the present invention. The receiver 50 comprises co-polarization and cross-polarization receiver channels 51,52 for respectively processing co-polarized and cross-polarized signals. The co-polarized signals are amplified in a low noise amplifier 11 and applied to a summing device 12 which sums the amplified co-polarized signals with an output derived from the equalizer 10. The output of the summing device 12 is downconverted in a downconverter 13 and demodulated in a demodulator 15. I and Q output signals from the demodulator 15 are processed by a least mean-square estimate adaptive baseband equalizer 16 whose I and Q output signals are processed by a bit sync data detection circuit 17 to produce baseband output I and Q and clock (CLK) signals from the receiver 50. The cross-polarized signals are also processed by a substantially identical receiver channel 52 (although only a portion there is shown). An output of a power divider 18 of the co-polarization receiver channel 51 is applied as an input signal to the adaptive cross-polarization equalizer 10. The circuitry shown in FIG. 1 illustrates only the adaptive cross polarization equalizer 10. A second equalizer identical 10 is (provided to equalize the cross-polarization channel 52.

The adaptive cross-polarization equalizer 10 comprises a baseband error signal detector 40, control logic 30, and a vector modulator 20, respectively encircled by dashed lines in FIG. 1. The baseband error signal detector 40 includes first and second squaring circuits ($X^2$) 41, 42 that process error signals ($I_e$, $Q_e$) generated by the least mean-square estimate adaptive baseband equalizer 16. Squared outputs of the first and second squaring circuits 41, 42 are summed in a summing device 44 and filtered by a low pass filter (LPF) 43. The filtered output of the low pass filter 43 is applied to the control logic 30.

The control logic 30 comprises an analog to digital converter (A/D) 36 which processes the output of the low pass filter 43 to produce digitized signal for processing. The output of the analog to digital converter 36 is processed by a logic circuit 35 (LOGIC) which generates control signals that control the vector modulator 20. The output of the logic circuit 35 is demultiplexed by a demultiplexer 33, and outputs of the demultiplexer 33 control the vector modulator 20.

The vector modulator 20 comprises first and second multipliers 22, 23 that combine output signals derived from the respective demultiplexer 33 with output signals generated by a zero-degree hybrid 24. The zero-degree hybrid 24 generates its output signals from the output of the power divider 18 of the cross-polarization receiver channel 52. Outputs of the respective multipliers 22, 23 are applied to a ninety-degree hybrid 21 which combines the respective output signals therefrom and applies the summed signal to the summing device 12 in the co-polarized receiver channel 51 which sums this signal with the amplified co-polarized input signal.

The present equalizer 10 uses the error signal generated by the adaptive baseband equalizer 16 to determine the magnitude of the interfering signal and then inputs a cancelling signal until power in the error signal from the adaptive baseband equalizer 16 is minimized. In the present equalizer 10, the determination of the magnitude of the interfering signal is performed at baseband (after demodulation but prior to data detection) and cancellation is performed at RF, prior to dispersive microwave elements. The equalizer 10 enhances the capability for transmitting two unique signals in the same frequency allocation on orthogonal polarizations. The equalizer 10 operates even if the modulations and data rates on the two channels 51, 52 are different.

The present equalizer 10 provides a simple and inexpensive cross-polarization interference cancellation system. The equalizer 10 may be used with any digital modulation format and any data rate above ten Mbps on either channel. The equalizer 10 tracks variations in cross-polarization interference amplitude and phase of 10 Hz, minimum. If the cross-polarization phenomena is dispersive, additional taps may be added at RF and controlled using the same architecture.

The present equalizer 10 provides a solution to the problem of cancelling an interfering signal due to low cross-polarization isolation caused by rain, for example, on high data rate communication links. In the receiver 50, both transmitted polarizations are received and amplified. A signal from the cross channel is supplied to the other receiver channel 51, 52. The RF vector modulator 20 is used to control the phase and amplitude of the cross-polarized signal prior to summation with the co-polarized signal. When the amplitude and the phase of the vector modulator 20 are correctly set, the interfering signal is cancelled.

Control for the vector modulator 20 is generated by minimizing the magnitude of the error signal in the least mean-square estimate adaptive baseband equalizer 16. The error signal is the difference between the received baseband data and an estimate of the ideal transmitted data. This signal is made up of data noise due to non-ideal channel, thermal noise, and the interfering signal. The ratio of the interfering signal power to noise power determines the effectiveness of the equalizer 10.

The control logic circuit 35 that sets the phase and amplitude for the vector modulator 20 to minimize the magnitude of the error signal does so by stepping the setting of the vector modulator 20 by one unit and sampling the power in the error signal. If the power is reduced the vector modulator 20 is stepped again in the same direction. If the power is increased the vector modulator 20 is stepped in the opposite direction. The vector modulator 20 has two controls corresponding to an I-Q coordinate system. The controls are dithered one at a time, four consecutive times each using the demultiplexer 33.

Figure 2:
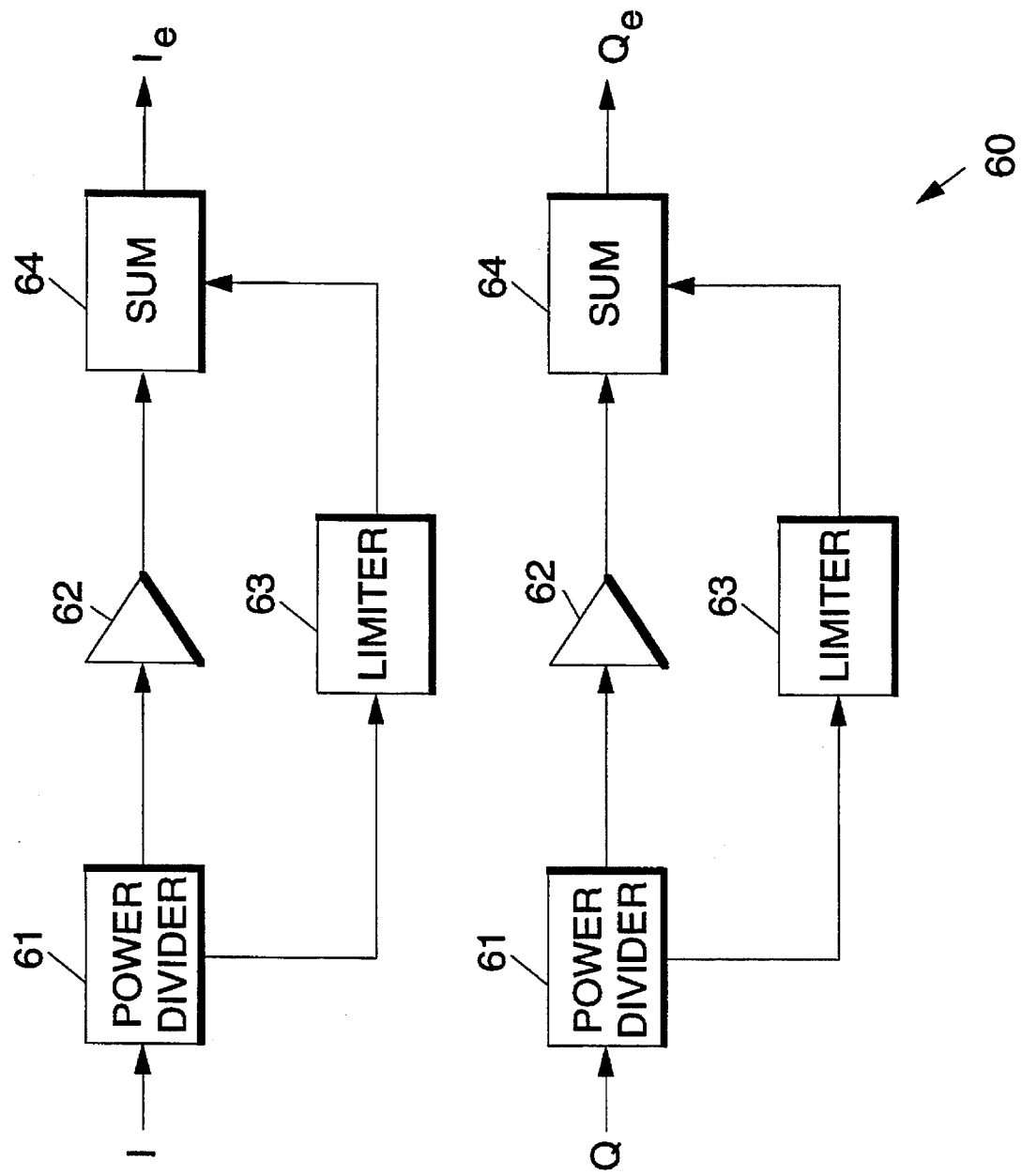
FIG. 2 shows error signal generation circuit that may be employed with the equalizer of FIG. 1.

Although the present equalizer 10 is designed for receivers 50 that employ an adaptive baseband transversal equalizer 16, the design is also applicable to receivers 50 that do not have an adaptive baseband transversal equalizer 16. In this case, error signal inputs to the equalizer 10 are replaced by I and Q analog inputs and the error signal circuitry normally provided by the adaptive baseband transversal equalizer is incorporated into the present equalizer 10. An error signal generation circuit 60 that implements this is shown in FIG. 2. The circuit 60 is comprised of a power divider 61 and inverter 62, a limiter 63, and a summing device 64 connected as shown that respectively process the I and Q signals to generate the I and Q error signals ($I_e$, $Q_e$). The circuit 60 of Fig. should be well understood by those skilled in the art.

The present equalizer 10 does not require symmetry between the orthogonal channels 51, 52. They may differ in both data rate and modulation. If the two cross polarization phenomena are not symmetrical, the equalizer 10 is not adversely effected. If the cross-polarization phenomena is dispersive, multiple vector modulators 20 may be added in a transversal filter arrangement and controlled in the same manner as described above. The present equalizer 10 has been built and tested in a laboratory against a cross-polarization model and works very well.

Thus there has been described a new and improved adaptive cross-polarization equalizer that provides for cancellation of an interfering signal due to low cross-polarization isolation caused by rain on high data rate communication links. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An adaptive cross-polarization equalizer for use with a receiver that provides for cancellation of an interfering signal due to low cross-polarization isolation, wherein the receiver comprises co-polarization and cross-polarization receiver channels for respectively processing co-polarized and cross-polarized input signals, and wherein each channel comprises a low noise amplifier for amplifying the input signals, a power divider, a first summing device, a down-converter, a demodulator, an adaptive baseband equalizer, and a bit sync data detection circuit for providing baseband output signals, and wherein said equalizer comprises:

a baseband error signal detector comprising first and second squaring circuits for squaring an error signal, represented by in-phase and quadrature error signals ($I_e$, $Q_e$), generated by the adaptive baseband equalizer of the co-polarization channel, a second summing device coupled to the squaring circuits for summing the squared error signals, and a low pass filter coupled to the second summing device for filtering the summed squared error signals;

control logic comprising an analog to digital converter for processing the filtered summed squared error signals from the low pass filter to produce digitized signals for processing, a logic circuit coupled to the analog to digital converter for generating control signals, and a demultiplexer coupled to the logic circuit; and a vector modulator comprising a zero-degree hybrid, first and second multipliers coupled to the zero-degree hybrid and to the demultiplexer that multiply output signals derived from the demultiplexer with output signals generated by the zero-degree hybrid, wherein the output signals of the zero-degree hybrid are derived from the output of the power divider of the cross-polarization receiver channel, and a ninety-degree hybrid coupled to outputs of the respective multipliers for combining the output signals from the multipliers and applying it to the first summing device of the co-polarization channel.

2. The adaptive cross-polarization equalizer of claim 1 which processes the error signal generated by the adaptive baseband equalizer to determine the magnitude of the interfering signal and then inputs a canceling signal until power in the error signal is minimized.

3. The adaptive cross-polarization equalizer of claim 1 wherein the vector modulator controls the phase and amplitude of the cross-polarized signal prior to summation with the co-polarized signal, and wherein the interfering signal is canceled when the amplitude and the phase of the combined output signals of the vector modulator are correctly set.

4. The adaptive cross-polarization equalizer of claim 1 wherein the control logic generates control signals for the vector modulator by minimizing the magnitude of the error signal in the adaptive baseband equalizer.

5. The adaptive cross-polarization equalizer of claim 4 wherein the error signal is the difference between received baseband data and an estimate of ideal transmitted data.

6. The adaptive cross-polarization equalizer of claim 1 wherein the control logic sets the phase and amplitude for the vector modulator to minimize the magnitude of the error signal by stepping the setting of the vector modulator by one unit and sampling the power in the error signal, wherein if the power is reduced the vector modulator is stepped again in the same direction, and wherein if the power is increased the vector modulator is stepped in the opposite direction, and wherein the control signals are dithered one at a time, four consecutive times each.

* * * * *